United States Patent [19]

Murray

[11] Patent Number: 5,296,167

[45] Date of Patent: * Mar. 22, 1994

[54] METHOD AND COMPOSITION FOR INHIBITING CORROSION BY SODIUM AND CALCIUM CHLORIDE

[76] Inventor: W. Bruce Murray, 28 Willow Grove, Irvine, Calif. 92714

[*] Notice: The portion of the term of this patent subsequent to Jul. 18, 2006 has been disclaimed.

[21] Appl. No.: 699,370

[22] Filed: May 13, 1991

[51] Int. Cl.$^5$ .................... C09K 3/18; C23F 11/06
[52] U.S. Cl. ...................... 252/387; 252/70; 252/389.2; 252/389.23; 422/7; 422/15
[58] Field of Search ............ 252/70, 387, 389.2, 252/389.23; 422/15, 7

[56] References Cited

U.S. PATENT DOCUMENTS

| | | | |
|---|---|---|---|
| 1,903,041 | 3/1933 | Hall et al. | 210/697 |
| 1,997,256 | 4/1935 | Hall | 210/697 |
| 2,597,406 | 5/1952 | Thome-Johannesen | 148/263 |
| 2,900,222 | 8/1959 | Kahler | 422/18 |
| 2,988,509 | 6/1961 | Schilberg | 252/70 |
| 3,029,127 | 4/1962 | Pollitzer | 422/15 |
| 3,215,637 | 11/1965 | Clerbois | 252/387 |
| 3,248,249 | 4/1966 | Collins | 106/286.2 X |
| 3,313,650 | 4/1967 | Raeuber | 106/14.12 X |
| 3,432,428 | 3/1969 | Wirth et al. | 210/698 |
| 3,542,686 | 11/1970 | Miller | 252/70 |
| 3,589,858 | 6/1971 | Ralston | 422/18 |
| 3,613,788 | 10/1971 | Kautsky | 252/8.555 X |
| 3,624,243 | 11/1971 | Scott et al. | 252/70 |
| 3,669,616 | 6/1972 | Murray et al. | 422/3 |
| 3,669,901 | 6/1972 | Murray | 252/387 |
| 3,837,803 | 9/1974 | Carter et al. | 422/13 |
| 3,869,317 | 3/1975 | Marx | 148/245 |
| 3,928,221 | 12/1975 | Slater et al. | 252/70 |
| 3,960,576 | 6/1976 | Carter et al. | 422/15 |
| 4,239,648 | 12/1980 | Marshall et al. | 252/389.2 |
| 4,268,397 | 5/1981 | Horie et al. | 210/746 |
| 4,297,237 | 10/1981 | Boffardi | 252/389.2 |
| 4,303,568 | 12/1981 | May et al. | 252/389.2 |
| 4,448,702 | 5/1984 | Kaes et al. | 252/70 |
| 4,512,907 | 4/1985 | McConnell | 252/70 |
| 4,654,157 | 3/1987 | Fukunaga | 252/70 |
| 4,668,416 | 5/1987 | Neal | 252/70 |
| 4,692,259 | 9/1987 | Roman | 252/70 |
| 4,803,007 | 2/1989 | Garber | 252/70 |
| 4,824,588 | 4/1989 | Lin | 252/70 |
| 4,849,171 | 7/1989 | Murray | 252/389.2 X |
| 4,978,500 | 12/1990 | Murray | 422/7 |
| 4,990,278 | 2/1991 | Wyeth | 252/70 |
| 5,064,551 | 11/1991 | Smith | 252/70 |

FOREIGN PATENT DOCUMENTS

| | | |
|---|---|---|
| 180568A | 5/1986 | European Pat. Off. . |
| 1459642 | 1/1969 | Fed. Rep. of Germany . |
| 1459664 | 1/1969 | Fed. Rep. of Germany . |
| 3028372 | 2/1972 | Fed. Rep. of Germany . |
| 003853 | 1/1974 | Japan . |
| 60-195178 | 10/1985 | Japan . |
| 63-086791 | 4/1988 | Japan . |
| 482488 | 11/1971 | U.S.S.R. . |
| 1249057 | 8/1986 | U.S.S.R. . |
| 1536660 | 1/1969 | United Kingdom . |
| 1555468 | 11/1979 | United Kingdom . |

OTHER PUBLICATIONS

The Encyclopedia of Chemistry, 3rd Ed., pp. 835–836.
Riegel's Handbook of Industrial Chemistry, 7th Ed., p. 557.

*Primary Examiner*—Robert L. Stoll
*Assistant Examiner*—Valerie Fee
*Attorney, Agent, or Firm*—Plante, Strauss & Vanderburgh

[57] ABSTRACT

There is disclosed a method to inhibit the corrosion of metals by sodium chloride and calcium chloride solutions by incorporating in the solutions a mixture of mono- and di-hydrogen orthophosphates. Sodium chloride solutions which contain calcium chloride, e.g., rock salt solutions, are inhibited against corrosion when the percentage of dihydrogen orthophosphate is from 10 to 60 percent of the mixture of di- and mono-hydrogen orthophosphates. Calcium chloride solutions are inhibited against corrosion when the percentage of dihydrogen orthophosphate is from 50 to 100 percent of the mixture of di- and mono-hydrogen orthophosphates.

7 Claims, 1 Drawing Sheet

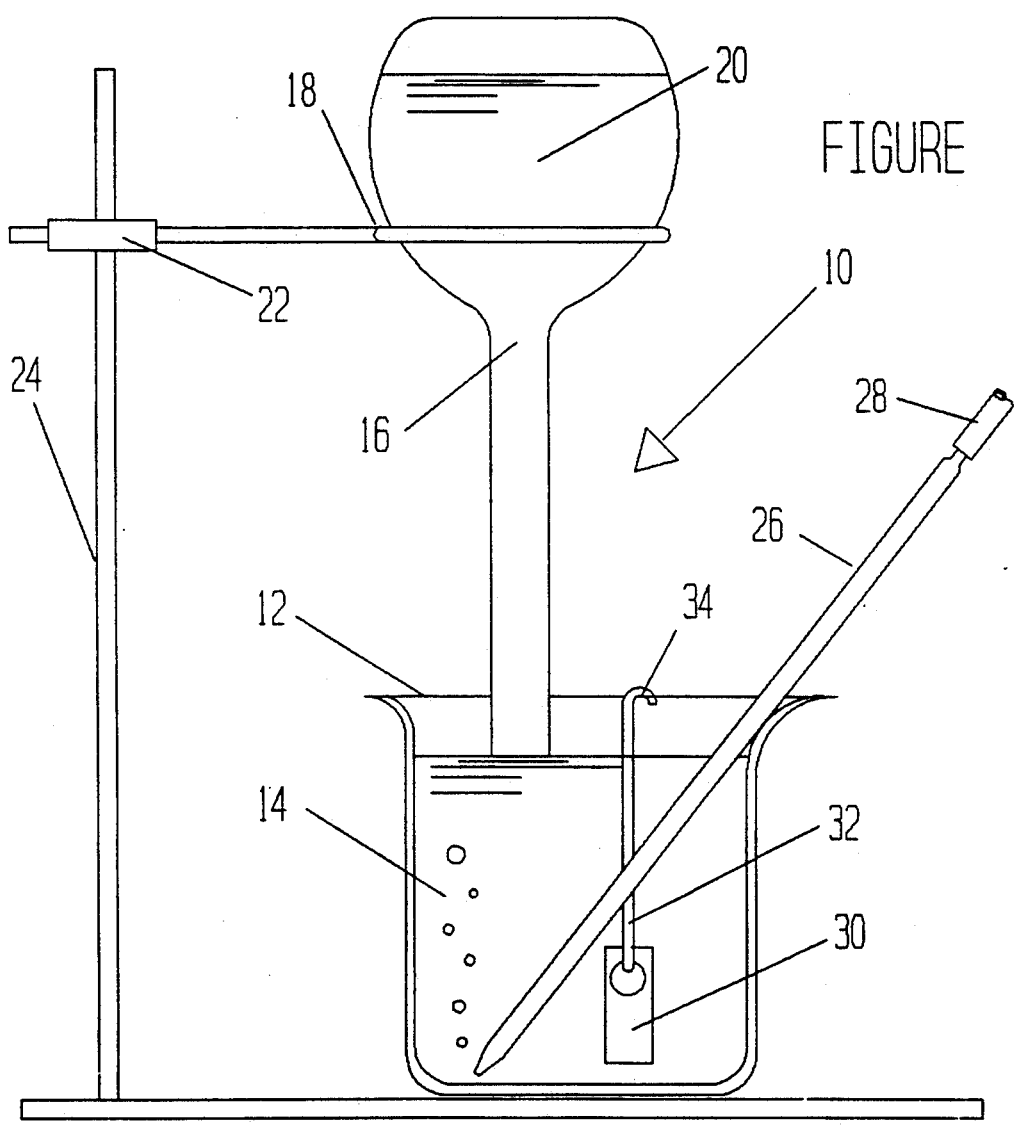
FIGURE

METHOD AND COMPOSITION FOR INHIBITING CORROSION BY SODIUM AND CALCIUM CHLORIDE

BACKGROUND OF THE INVENTION

1. Field of Invention

This invention relates to a method and composition for inhibiting the corrosion of sodium and calcium chlorides and, in particular, to a method and composition ideally suited for treatment of rock salt used for deicing roads and highways.

2. Background of the Invention

Sodium and calcium chloride are widely used industrial chemicals. Perhaps the most commonly observed application of sodium and calcium chlorides is the use of these salts as a road cover in freezing climates, where their high solubility depresses the freezing point of water, thereby melting ice and snow on the surfaces to which it is applied. Other applications of significant volume are the use of calcium chloride as a curing accelerator in concrete, as an additive in drilling muds to control density and clay flocculation, as a drainage aid in paper mills, as a high density liquid used as ballast in tractor tires, and as a desiccant in refrigeration plants.

A common problem experienced in the various applications of sodium and calcium chloride is that the salts promote corrosive attack on metal surfaces. The corrosiveness of sodium and calcium chloride brines is particularly troublesome in the road cover applications where the brine which is splashed on the undersurfaces of cars can cause rapid corrosion and deterioration of the under panels and rocker panels of a car. Since modern car manufacturing techniques have almost universally adopted unitized construction for weight and manufacturing efficiencies, any corrosive attack of brines on the undersurfaces of automobiles is particularly troublesome as the deterioration of such surfaces by corrosion is often not economically repairable. Furthermore, the salts added to roads adversely affects roadside vegetation and has been observed to have killed roadside trees. These salts are frequently transported as saturated brine solutions in pipeline, and their corrosiveness to steel presents a significant problem to such handling.

The use of calcium chloride brines in other applications such as concrete curing accelerators or as additives to drilling muds also creates serious corrosion problems. Most construction concrete is reinforced with steel bars which are embedded in the concrete and the presence of calcium chloride in the concrete accelerates corrosive attack of the reinforcing steel. The calcium chloride in drilling muds causes an accelerated corrosion of well tubing and equipment used in oil drilling applications. The use of calcium chloride as a drainage aid in the paper industry has been limited by the corrosive nature of its solutions.

The problem of accelerated corrosion by sodium and calcium chloride brines is thus a problem which has not, heretofore, been adequately addressed by the prior art. Some solutions to the problem have included the substitution of other salts such as calcium or magnesium acetates or chromates for the road cover applications. These substitutions are not satisfactory because of a prohibitively high cost and because of potentially adverse effects on the environment.

Ideally, any corrosion inhibitor used with sodium and calcium chlorides should be effective at extremely low concentrations to minimize environmental problems and should be colorless to avoid staining or discoloring of metal surfaces, wearing apparel and the like which come in contact with brine solutions of sodium or calcium chloride. The inhibitor should be effective over a very wide range of concentrations, particularly when applied for inhibiting corrosion of brines used in road covers since the brines which are formed by melting of ice and snow in the presence of sodium and calcium chloride can be expected to have an extremely wide range of concentration of the sodium and calcium chloride. The inhibitor should also be soluble over the wide range of concentrations anticipated in its application.

OBJECTS OF THE INVENTION

It is an object of this invention to inhibit the corrosion of sodium and calcium chlorides.

It is an additional object of this invention to provide a composition and method of treatment of sodium and calcium chlorides to inhibit their corrosivity to metals.

It is also an object of this invention to provide a composition and method suitable for treatment of rock salt as it is applied to roads and highways as a deicing aid.

It is a further object of the invention to provide a method and composition for inhibiting corrosion of sodium and calcium chlorides and its brines in other applications such as in oil well operations, concrete accelerators, refrigeration, tire ballast, dust control and mining operations.

It is also an object of this invention to provide a composition and method of treating rock salt that will aid in maintaining the salt crystals on roads and highways after application.

BRIEF STATEMENT OF THE INVENTION

The composition used in most applications of the invention comprises a concentrated solution of calcium chloride, typically from 5 to 45 weight percent and containing a uniform concentration of 40 grams/gallon of orthophosphate (as $PO_4^{-3}$) at a pH ranging from 4.0 to 6.0. Preferably, the pH value of the composition is buffered by the addition of a sufficient quantity of an alkaline buffering agent such as calcium carbonate and or magnesium hydroxide. Calcium chloride is used at a sufficient concentration to provide a freezing point to the composition which is from minus 40° F. to about minus 60° F., sufficient to ensure that the composition will remain liquid at substantially all ambient winter temperatures which are encountered.

The method of the invention comprises the application of the composition of the invention to the surface of solid crystals of sodium chloride in sufficient dispersion and concentration to substantially coat the surfaces of the salt crystals. Generally a dosage in the amount of 7 gallons per lane mile of the inhibited calcium chloride brine (assuming a preferred 29.6% composition) can be expected to treat sodium chloride crystals applied to a roadway at a dosage ranging from 300 lbs. to 800 pounds per lane mile of roadway.

BRIEF DESCRIPTION OF THE DRAWINGS

The FIG. 1 illustrates a laboratory apparatus used to investigate the effectiveness of the composition and method of the invention.

DESCRIPTION OF PREFERRED EMBODIMENT

The invention comprises a composition for inhibiting the corrosion of ordinary rock salt or solar salt, and a method for its application to crystals of the salt.

The preferred composition comprises an aqueous solution of sufficient calcium chloride to provide a freezing point that is from about minus 40 to minus 60 degrees F., thus insuring that the composition will be liquid at substantially all winter temperatures which are encountered during its use and application. The concentration of calcium chloride suitable for this purpose is from about 20 to 30 weight percent, preferably 29.6 weight percent. Rock salt moistened with this brine can be used to thaw ice at extremely low winter temperatures. Additionally, large crystals of the rock salt are prevented from "tire flicking" off a roadway due to vehicular traffic because of the liquid nature of the additive, and the low freeze temperature of the $CaCl_2$ brine prevents its orthophosphate inhibitors from prematurely freezing and becoming unavailable for the protective reaction.

The composition also contains from 0.5 to 5 wt % expressed as $(PO_4)^{-3}$ an orthophosphate corrosion inhibitor and, for this purpose, any water soluble orthophosphate is suitable. Examples of suitable orthophosphate which can be used include the alkali metal and alkaline earth orthophosphate such as sodium dihydrogen phosphate with or without a slight amount of sodium monohydrogen phosphate calcium dihydrogen phosphate with or without some calcium monohydrogen phosphate. The inhibitor ingredient can also contain some amounts of soluble hexametaphosphates, such as sodium hexametaphosphate in weight proportions from about 1/9 to 9/1 relative to the orthophosphate.

The source of sodium orthophosphate solution is produced by simply reacting caustic soda with phosphoric acid (10%) in a neutralization process so that the resulting pH of the solution ranges from 4.0 to 6.0. In turn, calcium orthophosphate solutions may be obtained by reacting alkali calcium hydroxide with phosphoric acid (10%) to achieve the desired 4.0 to 6.0 pH range.

A secondary source of calcium dihydrogen phosphate may be either normal or triple superphosphate using either magnesium hydroxide or calcium carbonate as pH buffers. The orthophosphate source can be added to liquid calcium chloride brine as a dry powder.

Any of the aforementioned orthophosphate sources are suitable, however, when using sources in which there is a limited dissolution rate of orthophosphate, e.g., dicalcium orthophosphate and/or superphosphates, some additional preparation time may be required to attain complete solubility of the orthophosphate.

Regardless if either sodium or calcium orthophosphate solutions are formulated, a sufficient quantity of the pH adjusted inhibitor must be added to the calcium chloride brine so as to furnish a concentration of 40 grams/gallon as $PO_4^{-3}$.

As the activity of the solution is sensitive to the pH of the corroding environment, it is important that the pH of the solution be adjusted to the optimum level for proper functioning. The pH range which has been found suitable for the composition is from 5 to 6. In some instances, such as when disodium hydrogen orthophosphate is added, it may not be necessary to treat the solution any further to achieve the desired pH value. Generally, however, the addition of an alkaline buffering agent is necessary and suitable buffering agents include calcium carbonate and magnesium hydroxide or oxide. These buffering agents are used in very minor to trace amounts. The precise quantities necessary can be determined by titration of a sample of the solution with aliquot portions of the alkaline buffering solution to arrive at a pH value within the aforementioned range. In the case where the source of the calcium dihydrogen phosphate is a superphosphate at its 4.0 gram $PO_4^{-3}$ per gallon concentration, the magnesium hydroxide buffer should be at a dosage of 4 grams per gallon and if calcium carbonate is used from 4 to 8 grams per gallon.

The crystals of the salt which are treated in accordance with the invention will vary considerably in particle size, depending on the source and intended use or application of the salt. Typically, particle sizes ranging from about 10 to about 200 mesh U.S. standard, will be encountered.

The composition of the invention can be applied to the salt crystals at any time, however, it is preferred to apply the solution as a coating to the salt crystals either immediately before, during or immediately after the application of the crystals for their intended use. It is desired to add the composition at the time of use of the salt crystals as the composition is a liquid under substantially all treatment conditions and the liquid could otherwise lead to a agglomeration of the salt crystals during storage.

The particular manner of application of the solution to the salt crystals is as widely varied as there are dispersion techniques for application of liquids to solid particles. The most commonly practiced method is to spray the solution onto the particles as the particles are either tumbled or stirred into a solvent or distributed as a thin layer across a surface, as commonly practiced in the application of salt crystals to roads and highways for deicing. In the latter application, salt crystals are commonly dispersed with a spreader that is carried at the tailgate of a truck. For this application, the inhibitor composition of the invention can be sprayed onto the salt crystals in the spreader or, preferably, onto the salt particles after they have been distributed across the road bed. In a typical application in which salt crystals are applied at a rate from about 300 to about 800 pounds per lane mile of roadway, the composition of the invention can be applied to the resultant layer of salt crystals by spraying the composition preferably 29.6% $CaCl_2$ brine (inhibited) directly onto the crystals on the road bed, volumetrically at 7 gallons per lang mile or quantitatively, 75.6 pounds per lane mile.

The mechanism or theoretical explanation for the functioning of the composition of the invention is described in the following paragraphs.

Iron and steel, the most prevalent metals on vehicles which could potentially suffer from chloride attack, corrode in aerated water according to the following equation:

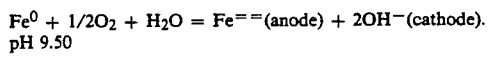
$Fe^0 + 1/2 O_2 + H_2O = Fe^{==}$(anode) $+ 2OH^-$(cathode).
pH 9.50

The rise in pH at the cathode, due to the production of hydroxyl ions, causes the water boundary layer at this electrode to become alkaline. Cations and anions which are subject to this alkalinity in the treated brine are $Ca^{==}$, $Na^=$, $Cl^-$, $HPO_4^=$, and $H_2PO_4^-$. When the water boundary layer contains calcium at a concentration of at least 150 ppm and a pH of about 9.00, the calcium, phosphate and hydroxyl ions precipitate on the surface of the cathode as a thin coating of either hydroxyapatite, $Ca_5(PO_4)_3(OH)$, an extremely insoluble coating or tricalcium phosphate, in accordance with the following reaction:

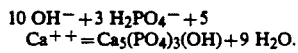

$10\ OH^- + 3\ H_2PO_4^- + 5\ Ca^{++} = Ca_5(PO_4)_3(OH) + 9\ H_2O$.

The hydroxyapatite has a known solubility product of $K_{SO} = 10^{-55.9}$. The actual amount of phosphate required to precipitate this material on the surface of the metal at the 150 mg/liter calcium concentration and at a pH value of 9 may be calculated as follows: For calcium ;hydroxyapatite:

1. $(Ca^{++})^5(PO_4^{-3})(OH) = 10^{-55.9}$
2. $(1.5 \times 10^{-3})^5 (PO_4)^3 (10^{-5}) = 10^{-55.9}$
3. $(PO_4)^3 = 1.2 \times 10^{-13}$ M, or
4. $3.7 \times 10^{-6}$ micrograms/liter as phosphorous.

For tricalcium phosphate, under the same conditions:

1. $(Ca^{++})^3 (PO_4)^2 = 10^{-24}$

2. $(PO_4^{-3}) = \left[\dfrac{10^{-24}}{(1.5 \times 10^{-3})^3}\right]^{\frac{1}{2}} = 1.6 \times 10^{-6}$ M, or 3. $PO_4^- = 0.5$ micrograms/liter as phosphorus.

Thus, with these low phosphate requirements, it is apparent that either one of these two deposits may be formed on the cathodic surface of the iron or steel when the ratio of calcium chloride to superphosphate is present, as described in the formulation of this invention.

The FIG. 1 illustrates a laboratory apparatus used to evaluate the anti-corrosion properties of compositions. As illustrated, the apparatus includes a standard laboratory beaker 12 which is substantially filled with the liquid solution 14 under investigation. An Erylermeyer flask 16 is also filled with the liquid 20 and placed inverted over the solution and supported by a laboratory ring arm 18 on a laboratory stand 24 to provide a continuous source of the liquid, thereby maintaining the liquid level in the beaker. A pipet 26 is secured by rubber tubing 28 to a compressed air source and air is slowly bubbled into the solution to maintain it in aerated. A coupon 30 of the metal under investigation is suspended in the solution by a glass rod 32 which is bent into hooks 34 at its opposite ends, thereby providing a supporting hook at its lower end for suspension of the coupon and a hook at its upper end which is placed over the upper rim of the beaker.

The aforedescribed laboratory apparatus is used for investigation of compositions of the invention as described in the following examples, which will serve to illustrate the application of the invention and results obtainable thereby:

EXAMPLE 1

Thirty-eight grams of sodium dihydrogen phosphate are added to one gallon volume of 30% calcium chloride brine which was buffered to a pH value of 4.65 by the addition of a 4 gram increment of magnesium hydroxide and 4 and 8 gram increments of calcium carbonate, to prepare three stock solutions.

In the first investigation, $\frac{1}{2}"$ wide $\times 3"$ long $\times 1/16"$ thick mild steel specimens were submerged in the stock solutions and placed in a refrigerator at $-10$ degrees C. for 24 hours. At the conclusion of the refrigerator exposure test, the following net weight change in the specimens was observed:

| Specimen Data | Magnesium Hydroxide | Calcium | Carbonate |
|---|---|---|---|
| (Grams) | 4 grams | 8 grams | |
| Start | 10.7419 | 9.9472 | 8.3827 |
| Stop | 10.7463 | 9.9500 | 8.3875 |
| Net | +0.0044 | +0.0028 | +0.0048 |

The positive net weights indicate an increase in weight of the specimens, reflecting no corrosion, but instead, the deposition of a protective boundary layer on the specimens.

EXAMPLE 2

In a second test with the magnesium hydroxide and calcium carbonate stock solutions prepared in Example 1, above, two-milliliter portions were applied to the surface of 30-gram quantities of rock salt (equivalent to the 8 gallon of the stock solution per lane mile at a standard salt application rate), and diluted to one liter (3% NaCl brine). The resultant solutions were placed in the apparatus shown in the FIGURE, and mild steel specimens were submerged in the brine for 24 hours at room temperature. The steel samples were removed, dried and weighed, and were observed to have the encountered the following weight changes:

| Specimen Data | Magnesium Hydroxide | Calcium | Carbonate |
|---|---|---|---|
| (Grams) | 4 grams | 4 grams | 8 grams |
| Start | 11.1142 | 9.7656 | 10.6700 |
| Stop | 11.1148 | 9.7668 | 10.6709 |
| Net | +0.0006 | +0.0012 | +0.0009 |
| pH | 5.56 | 5.41 | 5.58 |

The positive net weight gains indicate that a protective layer was deposited on the steel specimens, and that no corrosion occurred.

EXAMPLE 3

In a similar study, 4-gram increments of magnesium hydroxide and calcium carbonate and 190 grams of normal super-phosphate were added to one gallon volumes of 30 weight percent calcium chloride brine in the test apparatus shown in the FIGURE, and the following data was obtained after 24 hours of exposure of the steel specimens at $-10$ degrees C.:

| Data | Hydroxide | Calcium | Carbonate |
|---|---|---|---|
| | 4 grams | 4 grams | 8 grams |
| Start | 9.2290 | 10.2091 | 9.5984 |
| Stop | 9.2323 | 10.2072 | 9.5978 |
| Net | +0.0033 | −0.0019 | −0.0006 |

The results indicated that the magnesium hydroxide buffered inhibitor was the most effective and demonstrated a net weight gain on the samples.

The experiments were repeated substituting 76 grams of triple superphosphate for the 190 grams of superphosphate previously employed. The following corrosion data were obtained:

| Specimen Data | Magnesium Hydroxide | Calcium | Carbonate |
|---|---|---|---|
| (Grams) | 4 grams | 4 grams | 8 grams |
| Start | 10.4794 | 11.1175 | 10.2051 |
| Stop | 10.4791 | 11.1171 | 10,2047 |
| Net | −0.0003 | −0.0004 | −0.0004 |

Although the samples indicated a slight weight loss the amount of the weight loss was marginal.

EXAMPLE 4

One liter volumes of 3 weight percent sodium chloride brine were used in the testing and 2-milliliter portions of the stock inhibitor solutions prepared in Example 3, above, were added to brine solutions, and the resultant inhibited brines were tested for corrosivity to mild steel specimens for 24 hours at −10 degrees C. The following corrosion rates were observed when the normal superphosphate composition was added to the brine:

| Specimen Data | Magnesium Hydroxide | Calcium | Carbonate |
|---|---|---|---|
| (Grams) | 4 grams | 4 grams | 8 grams |
| Start | 9.8406 | 9.0605 | 9.2272 |
| Stop | 9.8404 | 9.0591 | 9.2266 |
| Net | −0.0002 | −0.0014 | −0.0006 |
| pH | 5.47 | 4.98 | 4.89 |

The following corrosion rates were observed when the triple superphosphate composition was added to the brine:

| Specimen Data | Magnesium Hydroxide | Calcium | Carbonate |
|---|---|---|---|
| (Grams) | 4 grams | 4 grams | 8 grams |
| Start | 9.7762 | 11.1631 | 9.6408 |
| Stop | 9.7759 | 11.1617 | 9.6402 |
| Net | −0.0003 | −0.0014 | −0.0006 |
| pH | 4.85 | 4.83 | 5.71 |

The above tests demonstrated that the colloidal precipitates should be present in both the sodium orthophosphate and superphosphate, alkali buffered calcium chloride solutions. None of the test solutions froze under the test conditions.

In the following examples, a 29.6% $CaCl_2$ brine, which freezes (crystallizes) at −60 degrees F. was used.

EXAMPLE 5

In this example, the following combinations were recently laboratory tested:
1. A sodium hexametaphosphate/sodium orthophosphate liquid blend, and
2. Hydrated lime and phosphoric acid liquid slurry blends.

In the first experiment, measured portions of a solution of 15 weight percent sodium hexametaphosphate with 22 weight percent orthophosphate (13% $Na_2HPO_4$ and 8% $NaH_2PO_4$), pH 6.00, were added to 100 ml volumes of 29.6% $CaCl_2$ brine at various dosages ranging from 2.5 to 10 ml (see Table). A 24-hour, mild steel specimen corrosion study was conducted in which 2-milliliter quantities of the various corrosion inhibited calcium chloride brines were first sprayed on 30 gram increments of granular rock salt and then the salt was dissolved in one liter of water. The pH values in Table I represent the initial, one-liter brine pH measurements before mild steel specimen submergence. The addition of 2 milliliters of inhibited calcium chloride brines to the rock salt is equivalent to a 7 gallon per lane mile inhibitor dosage rate.

| POLYPHOSPHATE/ORTHOPHOSPHATE BLEND IN 29.6% CALCIUM CHLORIDE | | | | |
|---|---|---|---|---|
| Milliliters Of Inhibitor In 100 milliliters of $CaCl_2$ Brine | | | | |
| | 2.5 | 5 | 7.5 | 10 Volume |
| pH | 6.79 | 6.64 | 6.35 | 6.17 |
| Specimen Weights Grams | | | | |
| Initial | 10.4202 | 10.1280 | 9.9943 | 9.6877 |
| Final | 10.4193 | 10.1276 | 9.9946 | 9.6892 |
| Net | −0.0009 | −0.0004 | +0.0003 | +0.0015 |

It is concluded from the net specimen weight data that the minimum concentration of the metaphosphate/orthophosphate inhibitor for corrosion inhibition is 7.5 milliliters per 100 milliliters of the 29.6% $CaCl_2$ brine. At or above this concentration, the solution becomes metal scale depositing.

In the following experiment, hydrated lime [$Ca(OH)_2$] was added to 10 milliliters of 10 weight percent phosphoric acid in the varied amounts set forth in the following Table, and 10-milliliter portions of the resultant solutions were then added to 100 milliliters of 29.6 weight percent calcium chloride brine. Thirty gram samples of rock salt were coated with 2 milliliters of the calcium chloride brine, and dissolved in one liter of water. Steel specimens were immersed in the treated salt brine and the weight change of the specimens was measured after 24 hours of immersion.

| | SAMPLE | | | | | |
|---|---|---|---|---|---|---|
| | A | B | C | D | E | F |
| | | | | Gms | | |
| $Ca(OH)_2$ | 3.78 | 4.20 | 4.60 | 5.03 | 6.29 | 7.55 |
| Specimen Weights in Grams | | | | | | |
| Initial | 9.6962 | 9.8438 | 9.4872 | 10.4293 | 10.1515 | 10.0090 |
| Final | 9.6966 | 9.8444 | 9.4881 | 10.4283 | 10.1495 | 10.0069 |
| Net | 0.0004 | 0.0006 | 0.0009 | −0.0010 | −0.0020 | −0.0021 |

The data revealed that samples in which the lesser quantities of calcium hydroxide were added to phosphoric acid were the most effective inhibitors, again emphasizing the importance of an acidic pH value for the inhibitor.

In the preceding experiments, Samples A, D and F corresponded to the stoichiometric proportions according to the following chemical formulas:

| A) Formula: $Ca(OH)_2 + 2H_3PO_4 = Ca(H_2PO_4)_2 + 2H_2O$ | | | |
|---|---|---|---|
| Proportions: | 74 | 196 | 234 | 36 |
| Grams: | (3.78) | (10) | (11.94) | (1.84) |
| D) Formula: $2Ca(OH)_2 + 3H_3PO_4 = CaHPO_4 + Ca(H_2PO_4)_4 + 4H_2O$ | | | |
| Proportions: | 148 | 294 | 136 | 234 | 72 |
| Grams: | (5.03) | (10) | (4.63) | (7.96) | (2.45) |
| F) Formula: $Ca(OH)_2 + H_3PO_4 = CaHPO_4 + 2H_2O$ | | | |
| Proportions: | 74 | 98 | 136 | 36 |
| Grams: | (7.55) | (10) | (13.88) | (3.67) |

The various quantities of calcium hydroxide required in the three formulations (shown in parenthesis) represent the amount, in grams, necessary to react with 10 weight percent phosphoric acid solutions. The following Table summarizes the experimental data in which 10-milliliter portions of six liquid/slurries were combined with the 100-milliliter increments of calcium chloride brine (29.6%). The 2-milliliter portions of each calcium chloride inhibited formulations, A through F, applied to the 30 grams of rock salt crystals, represent a 7 gallon per lane mile dosage rate.

Analysis of the net specimen weight data in the above table indicates that the calcium hydroxide and phosphoric acid neutralization reaction cannot exceed the quantities shown in Sample B.

Apparently, the production of the monocalcium phosphate exceeds its 200 mg/liter solubility rate in the treated sodium chloride brine.

The six variable proportions of calcium hydroxide and phosphoric acid combinations yielded increasing amounts of precipitates ranging from a minimum in Sample A to a maximum in Sample F.

EXAMPLE 6

Rock salt, which contains about 135 ppm calcium as an impurity was treated directly with the phosphate

|  | SAMPLE: | | | |
|---|---|---|---|---|
|  | A | B | C | D |
| $NaH_2PO_4$: | 1.47 | 1.32 | 1.18 | 1.03 |
| $NaHPO_4$: | 0 | 0.15 | 0.29 | 0.44 |
| pH: | 7.06 | 6.94 | 7.12 | 6.99 |
| Specimen Weight Change: | | | | |
| Steel | .0002 | .0006 | −.0011 | −.0008 |
| Aluminum: | −.0002 | −.0002 | −.0004 | −.0007 |

The data indicate that the optimum concentration of the $NaH_2PO_4$ in the mixture is from about 90 to 100%, and that the corrosion rapidly increases as the concentration of $Na_2HPO_4$ increases over 10 weight percent.

EXAMPLE 8

Another series of experiments was performed in which the proportions of $NaH_2PO_4$ and $Na_2HPO_4$ were varied in 10 percent increments. The corrosion tests were performed on 3% salt brine prepared from rock salt coated with the inhibitor and 3% $CaCl_2$ brine containing the inhibitor. The following table summarizes the experiments and results obtained: Weight gain not

| | SAMPLE: | | | | | | | | | | |
|---|---|---|---|---|---|---|---|---|---|---|---|
| | A | B | C | D | E | F | G | H | I | J | K |
| | Corrosion Rates in 3% Salt Brine | | | | | | | | | | |
| $Na_2HPO_4$ | 0 | .1 | .2 | .3 | .4 | .5 | .6 | .7 | .8 | .9 | 1 |
| $NaH_2PO_4$ | 1 | .9 | .8 | .7 | .6 | .5 | .4 | .3 | .2 | .1 | 0 |
| pH: | 4.58 | 4.60 | 4.56 | 4.58 | 4.63 | 4.68 | 4.74 | 4.96 | 5.19 | 5.17 | 5.05 |
| Change: | −.05 | −.047 | −.0324 | −.0103 | −.0008 | −.0005 | −.0007 | −.0004 | .0036 | .0007 | −.0023 |
| | Corrosion Rates in 3% CaCl2 Salt Brine | | | | | | | | | | |
| $Na_2HPO_4$ | 0 | .1 | .2 | .3 | .4 | .5 | .6 | .7 | .8 | .9 | 1 |
| $NaH_2PO_4$ | 1 | .9 | .8 | .7 | .6 | .5 | .4 | .3 | .2 | .1 | 0 |
| Change: | .0115 | .0015 | .0057 | .0070 | .0005 | .0006 | −.0013 | −.0027 | −.0037 | −.0039 | −.0041 | inhibitor at varied dosages in 0.1 gram increments (from 0.1 to 1.0 gram) to determine the minimum concentration of inhibitor required. The increments of the mixture of 80% $Na_2HPO_4$ and 20% $NaH_2PO_4$ were added to the surface of 14 grams of moistened rock salt, and the salt was dissolved in water to prepare 3% sodium chloride solutions. Each solution was tested for corrosivity using the aforedescribed steel specimen immersion test at −10 degrees F. The following table summarizes the samples tested and the results:

| | Sample: | | | | | | | | | |
|---|---|---|---|---|---|---|---|---|---|---|
| | A | B | C | D | E | F | G | H | I | J |
| Inhib.: | .1 | .2 | .3 | .4 | .5 | .6 | .7 | .8 | .9 | 1.0 |
| Change: | −.007 | −.008 | .0006 | .0002 | .001 | .0013 | .0005 | .0000 | .0001 | −.0001 |

The results indicate that a very rapid decrease in corrosion occurs when the inhibitor concentration exceeds 0.1 gram per 14 grams of rock salt (0.7%).

EXAMPLE 7

A set of experiments was performed to determine the proper proportions of sodium dihydrogen orthophosphate and disodium hydrogen orthophosphate (pH effect) on corrosion inhibition of steel and aluminum specimens. In the experiments, varied proportions of the two salts were mixed, the pH values determined, and corrosion tests with the previously described immersion procedure were conducted. The following table summarizes the tests and results:

The results indicate that the optimum proportions (and pH) of the two phosphate salts differs for the brines; minimum corrosion of the calcium chloride brine is achieved at concentrations of $Na_2HPO_4$ from 0 to 50 percent, while minimum corrosion of salt brines is achieved at concentrations of $Na_2HPO_4$ from 40 to 90 percent.

The invention provides a very simple method for inhibiting the corrosion of salt, wherever encountered. It is particularly suitable for inhibiting the corrosion of salt as applied to road beds to prevent icing. In this application, the composition not only inhibits the corrosion of the applied salt but also reduces the dryness of the salt under conditions of dry road beds or very low sub-zero temperatures. When such conditions are encountered there is a tendency for traffic to dislodge or throw the salt from the road bed, reducing its effectiveness. Since the composition of the invention is a liquid under most winter temperatures, the composition wets the surface of the salt crystals and promotes their adhesion to the road surface, resisting the tendency of traffic to throw the crystals away from the road bed.

The invention is also environmentally sound as it does not burden the environment with a toxic or foreign substance. Instead, the very minute amounts of orthophosphate which are added and which remain in the environment will serve as limited quantities of a fertilizer, promoting plant growth during temperate climate conditions.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. The method for inhibiting the corrosion of metal by an aqueous solution of sodium chloride containing calcium ions which comprises:
incorporating in said aqueous solution of sodium chloride an alkali metal or alkaline earth metal orthophosphate comprising from 10 to 60 percent dihydrogen phosphate and from 90 to 40 percent mono-hydrogen phosphate in an amount from 0.7 to about 5 weight percent of the weight of said salt in said aqueous sodium chloride solution.

2. The method of claim 1 wherein said orthophosphate is present at a concentration from 0.7 to about 1.25 weight percent.

3. The method for inhibiting the corrosion of metal by an aqueous solution of calcium chloride which comprises:
incorporating in said aqueous salt solution an alkali metal or alkaline earth metal orthophosphate comprising from 100 to 50 percent dihydrogen phosphate and up to 50 percent mono-hydrogen phosphate in an amount from 0.7 to about 5 weight percent of the weight of said salt in said aqueous sodium chloride solution.

4. A method for inhibiting the corrosion of metal by aqueous solutions of sodium chloride which comprises applying to the surface of sodium chloride crystals prior to dissolution of said sodium chloride crystals to form said aqueous solution, an inhibitor solution containing from 20 to 30 weight percent calcium chloride and from 0.5 to 5 weight percent, expressed as $(PO_4)^{-3}$ of a soluble alkali metal or alkaline earth metal orthophosphate mixture comprising from 100 to 50 percent dihydrogen phosphate and up to 50 percent mono-hydrogen phosphate.

5. The method of claim 4 wherein said soluble orthophosphate is calcium orthophosphate.

6. The method of claim 4 wherein said inhibitor solution also contains from 0.05 to 1.0 weight percent of an alkaline buffer selected from the group consisting of calcium carbonate, magnesium oxide, magnesium hydroxide, and mixtures thereof.

7. The method of claim 6 wherein said buffer is magnesium hydroxide.

* * * * *